(12) United States Patent
Huang

(10) Patent No.: US 11,539,567 B2
(45) Date of Patent: Dec. 27, 2022

(54) MULTI-CARRIER SIGNAL GENERATION METHOD, APPARATUS, AND SYSTEM

(71) Applicant: ZTE CORPORATION, Shenzhen (CN)

(72) Inventor: Chen Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 334 days.

(21) Appl. No.: 16/325,052

(22) PCT Filed: Aug. 11, 2017

(86) PCT No.: PCT/CN2017/097258
§ 371 (c)(1),
(2) Date: Jul. 29, 2021

(87) PCT Pub. No.: WO2018/028704
PCT Pub. Date: Feb. 15, 2018

(65) Prior Publication Data
US 2021/0351967 A1 Nov. 11, 2021

(30) Foreign Application Priority Data
Aug. 12, 2016 (CN) .......................... 201610666311.0

(51) Int. Cl.
*H04L 27/26* (2006.01)

(52) U.S. Cl.
CPC .................................. *H04L 27/264* (2013.01)

(58) Field of Classification Search
CPC ..... H04L 27/00; H04L 27/26; H04L 27/2601; H04L 27/2626; H04L 27/2627; H04L 27/264; H04L 27/26412–26416; H04L 27/2647; H04L 27/2649; H04L 27/26534; H04L 27/2654

See application file for complete search history.

(56) References Cited

U.S. PATENT DOCUMENTS

| 6,638,409 | B1 * | 10/2003 | Huang | C25D 21/12 204/240 |
| 7,664,171 | B2 * | 2/2010 | Sun | H04L 25/03057 329/316 |

(Continued)

FOREIGN PATENT DOCUMENTS

| CN | 1913396 A | 2/2007 |
| CN | 103825862 A | 5/2014 |

(Continued)

OTHER PUBLICATIONS

Chinese Office Action for corresponding application 201610666311. 0; Report dated Apr. 22, 2021.

(Continued)

*Primary Examiner* — James M Perez
(74) *Attorney, Agent, or Firm* — Cantor Colburn LLP

(57) ABSTRACT

Provided are a multi-carrier signal generation method, apparatus, and system. The method comprises: according to property information of a subframe, determining filter configuration information corresponding to said subframe (101); according to the filter configuration information, obtaining a multi-carrier signal of the filter bank corresponding to each of the filter configuration information (102).

17 Claims, 1 Drawing Sheet

(56) References Cited

U.S. PATENT DOCUMENTS

| | | | | |
|---|---|---|---|---|
| 8,638,652 | B2* | 1/2014 | Cai | H04L 27/2605 370/344 |
| 8,842,601 | B2* | 9/2014 | Zhou | H04J 13/14 370/324 |
| 8,942,143 | B2* | 1/2015 | Ma | H04B 7/024 370/347 |
| 9,960,887 | B2* | 5/2018 | Sun | H04L 25/03159 |
| 10,313,174 | B2* | 6/2019 | Zhu | H04L 27/2654 |
| 10,484,209 | B2* | 11/2019 | Li | H04L 25/03 |
| 10,594,531 | B2* | 3/2020 | Baltar | H04L 27/26416 |
| 10,833,906 | B2* | 11/2020 | Xin | H04L 27/26025 |
| 11,177,995 | B2* | 11/2021 | Ferdinand | H04L 27/2602 |
| 11,272,518 | B2* | 3/2022 | Takeda | H04L 5/0096 |
| 2003/0231714 | A1* | 12/2003 | Kjeldsen | H04L 27/2601 375/259 |
| 2004/0252772 | A1* | 12/2004 | Renfors | H04L 27/26 375/260 |
| 2013/0083705 | A1* | 4/2013 | Ma | H04L 5/14 370/280 |
| 2014/0199076 | A1* | 7/2014 | Yu | H04B 10/6163 398/81 |
| 2015/0049836 | A1* | 2/2015 | Li | H04L 25/0232 375/295 |
| 2016/0065390 | A1* | 3/2016 | Kim | H04L 25/0224 375/260 |
| 2016/0191218 | A1* | 6/2016 | Bala | H04L 5/0044 370/330 |
| 2016/0204822 | A1* | 7/2016 | Yu | H04B 1/7101 375/219 |
| 2016/0380689 | A1* | 12/2016 | Sun | H04L 1/206 370/330 |
| 2017/0054539 | A1* | 2/2017 | Qian | H04L 5/0007 |
| 2017/0142702 | A1* | 5/2017 | Yu | H04W 72/0406 |
| 2017/0163463 | A1* | 6/2017 | Werner | H04L 27/2602 |
| 2017/0230138 | A1* | 8/2017 | Xiong | H04W 72/0453 |
| 2017/0257238 | A1* | 9/2017 | Qian | H04L 27/26025 |
| 2017/0311276 | A1* | 10/2017 | Tsai | H04B 7/0695 |
| 2017/0332376 | A1* | 11/2017 | He | H04L 5/18 |
| 2018/0092086 | A1* | 3/2018 | Nammi | H04L 5/003 |
| 2018/0302197 | A1* | 10/2018 | He | H04W 72/0453 |
| 2019/0097861 | A1* | 3/2019 | Kawasaki | H04L 27/26414 |
| 2019/0109743 | A1* | 4/2019 | Gattami | H04L 27/2654 |
| 2019/0173656 | A1* | 6/2019 | Takeda | H04W 72/04 |
| 2019/0261364 | A1* | 8/2019 | Takeda | H04W 72/02 |
| 2019/0386795 | A1* | 12/2019 | Matsumura | H04L 27/26 |
| 2020/0221422 | A1* | 7/2020 | Osawa | H04W 52/365 |
| 2020/0244390 | A1* | 7/2020 | Takeda | H04L 1/0013 |
| 2021/0058218 | A1* | 2/2021 | Harada | H04L 5/001 |
| 2021/0084663 | A1* | 3/2021 | Takeda | H04L 5/0051 |
| 2021/0227515 | A1* | 7/2021 | Takahashi | H04L 5/0094 |
| 2021/0351967 | A1* | 11/2021 | Huang | H04L 27/264 |

FOREIGN PATENT DOCUMENTS

| | | |
|---|---|---|
| CN | 104883238 A | 9/2015 |
| CN | 105493460 A | 4/2016 |
| CN | 105847209 A | 8/2016 |
| WO | 2013144715 A1 | 10/2013 |
| WO | 2015031075 A1 | 3/2015 |

OTHER PUBLICATIONS

Chinese Search Report for corresponding application 201610666311.0; Report dated Apr. 22, 2021.

English Translation of International Search Report for International Application No. PCT/CN2017/097258, dated Oct. 27, 2017, 2 pages.

* cited by examiner

MULTI-CARRIER SIGNAL GENERATION METHOD, APPARATUS, AND SYSTEM

CROSS-REFERENCE TO RELATED APPLICATION

This application is the 371 application of PCT Application No. PCT/CN2017/097258, filed Aug. 11, 2017, which is based upon and claims priority to Chinese Patent Application No. 201610666311.0, filed Aug. 12, 2016, the entire contents of which are incorporated herein by reference.

TECHNICAL FIELD

The present disclosure relates to, but is not limit to, the wireless communication technology, and more particularly, relates to a multi-carrier signal generation method, device and system.

BACKGROUND

With the development of wireless data service and the fifth generation of mobile communication technology (5G), 5G system requires high frequency, such as millimeter wave band, in order to achieve higher data rate.

Generally, Filter Band Multi-Carrier (FBMC) is used to perform carrier multiplexing on data in a high frequency band, that is, the longer time period occupied by the filter and the overlapping of codes may improve the transmission rate, reduce the out-of-band radiation, keep the frequency band narrow, and improve the spectral efficiency.

This section provides background information related to the present disclosure which is not necessarily prior art.

SUMMARY

The following is a summary of the subject matter detailed in the present disclosure. The summary is not intended to limit the scope of the claims.

Embodiments of the present disclosure provide a multi-carrier signal generation method, device and system, in order to meet the needs of different services or different channels or different users.

According to an embodiment of the present disclosure, there is provided a multi-carrier signal generation method, including:

determining, according to attribute information of a subframe, filter configuration information corresponding to the subframe, wherein the attribute information includes any one of the followings or a combination of more than one of the followings: a service type, subframe information, and channel information of a data signal; wherein the data signal includes a data signal carried on the subframe, and the service type includes delay information; and acquiring, according to each of the filter configuration information, a multi-carrier signal of filter bank corresponding to each of the filter configuration information.

Optionally, the subframe information includes any one of the following or a combination of more than one of the followings: subcarrier spacing, and subframe position information, wherein the subcarrier spacing includes a spacing between adjacent subcarriers of the subframe.

Optionally, determining, according to attribute information of a subframe, filter configuration information corresponding to the subframe, includes any one of the following or a combination of more than one of the followings:

determining, according to a subcarrier spacing of the subframe, a filter corresponding to the subframe; or determining, according to a delay requirement of the data signal carried by the subframe, a filter corresponding to the subframe; or determining, according to a delay requirement of the data signal carried by the subframe, a time domain extension of a filter corresponding to the subframe; or determining, according to subframe position information of the subframe, a filter corresponding to the subframe adjacent to an uplink and downlink switching point to be a filter with a small time domain expansion; or determining, according to subframe position information of the subframe, a time domain extension of a filter corresponding to the subframe adjacent to an uplink and downlink switching point to be consistent with edge of the subframe.

Optionally, further including:

setting filter of the symbol of the edge of the subframe to be different from filter of other symbols.

Optionally, further including:

after acquiring, according to each of the filter configuration information, a multi-carrier signal of filter bank corresponding to each of the filter configuration information, transmitting the filter configuration information to a terminal that receives the multi-carrier signal.

Embodiments of the present disclosure further provide a multi-carrier signal receiving method, including:

determining, according to filter configuration information transmitted by a network device, received filter information corresponding to the filter configuration information; and receiving, according to the received filter information, a multi-carrier signal transmitted by the network device;

Embodiments of the present disclosure further provide a multi-carrier signal generation apparatus, including:

a determination module, configured to, according to attribute information of a subframe, determine filter configuration information corresponding to the subframe, wherein the attribute information includes any one of the followings or a combination thereof: a service type, subframe information, and channel information of data signal; the data signal includes a data signal carried on the subframe; and the service type includes delay information; and an acquisition module, configured to, according to the filter configuration information, acquire a multi-carrier signal of a filter bank corresponding to each of the filter configuration information.

Optionally, the subframe information includes any one of the following or a combination of more than one of the followings: subcarrier spacing, and subframe position information; wherein the subcarrier spacing includes a spacing between adjacent subcarriers of the subframe.

Optionally, the determination module is configured, by means of any one of the following or a combination of more than one of the followings, to implement determining filter configuration information corresponding to the subframe according to attribute information of the subframe:

determining, according to subcarrier spacing of the subframe, a filter corresponding to the subframe; or determining, according to a delay requirement of the data signal carried by the subframe, a filter corresponding to the subframe; or determining, according to a delay requirement of the data signal carried by the subframe, a time domain extension of a filter corresponding to the subframe; or determining, according to subframe position information of the subframe, a filter corresponding to the subframe adjacent to an uplink and downlink switching point to be a filter with a small time domain expansion; or determining, according to subframe position information of the subframe, a time domain extension of a filter corresponding to the subframe adjacent to an uplink and downlink switching point to be consistent with edge of the subframe.

Optionally, the determination module is further configured such that the filter of the symbol of the edge of the subframe is different from the filter of other symbols.

Optionally, the determining module is further configured to transmit filter configuration information to a terminal that receives the multi-carrier signal.

Embodiments of the present disclosure further provide a multi-carrier signal receiving apparatus, including:

a determination module, configured to, according to filter configuration information transmitted by a network device, determine received filter information corresponding to the filter configuration information; and a receiving module, configured to, according to the received filter information, receive a multi-carrier signal transmitted by the network device.

Embodiments of the present disclosure further provide a system, including:

the multi-carrier signal generation apparatus as described above and the multi-carrier signal receiving apparatus as described above.

Embodiments of the present disclosure includes determining, according to attribute information of a subframe, filter configuration information corresponding to the subframe, wherein the attribute information includes any one of the followings or a combination of more than one of the followings: a service type, subframe information, and channel information of a data signal; wherein the data signal includes a data signal carried on the subframe, the subframe includes multiple symbols in a time domain, and the data signal is carried on the symbols; and acquiring, according to each of the filter configuration information, a multi-carrier signal of the filter bank corresponding to each of the filter configuration information. In the process of multi-carrier multiplexing, different filters are implemented for different services or different channels or different users, so as to meet the needs of the different services or different channels or different users and improve the efficiency of multi-carrier multiplexing.

Other aspects will be apparent after reading and understanding the drawings and detailed description.

This section provides a summary of various implementations or examples of the technology described in the disclosure, and is not a comprehensive disclosure of the full scope or all features of the disclosed technology.

DETAILED DESCRIPTION

The technical solutions in the embodiments of the present application will be described below with reference to the accompanying drawings.

Since the signal generation of FBMC is based on a same prototype filter, when the information of different services or different channels or different users in the 5G system is time division multiplexed, the same prototype filter cannot meet the requirements of the different services or different channels or different users.

Figure 1:
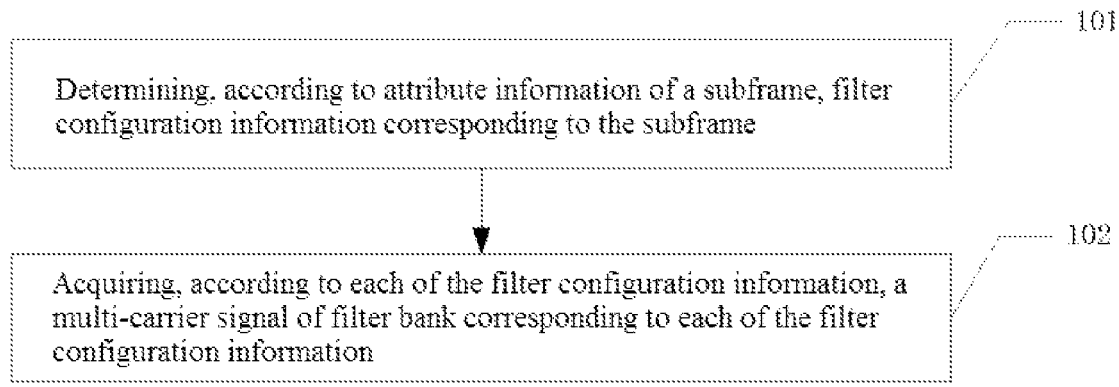
FIG. 1 is a schematic flowchart of a multi-carrier signal generation method according to an embodiment of the present application.

FIG. 1 is a schematic flowchart of a multi-carrier signal generation method according to an embodiment of the present application. As is shown in FIG. 1, the executor of the present embodiment may be a base station or other apparatus that can perform multi-carrier multiplexing, and the multi-carrier signal generation method according to the embodiment of the present invention includes:

in step 101, determining, according to attribute information of a subframe, filter configuration information corresponding to the subframe.

In the present embodiment, the attribute information includes any one of the followings or a combination thereof:

a service type, subframe information, and channel information of a data signal;

the data signal includes a data signal carried on the subframe, the subframe includes multiple symbols in time domain, and the data signal is carried on the symbols; and the service type includes delay information.

The subframe information includes any one of the following or a combination thereof:

subcarrier spacing, subframe position information;

the subcarrier spacing includes a spacing between adjacent subcarriers of the subframe.

In step 102, acquiring, according to each of the filter configuration information, a multi-carrier signal of filter bank corresponding to each of the filter configuration information.

Optionally, in the present embodiment, the multi-carrier generation manner is:

$$s(t) = \sum_{n=-x}^{+x} \sum_{m=0}^{Nn} a_{m,n} e^{j2\pi n f_n(t-T_n)} g_n(t-T_n)$$

wherein m is a subcarrier ordinal, Nn is a total number of subcarriers, n is a symbol ordinal, $a_{m,n}$ is a data signal carried on the nth symbol of the mth subcarrier, $T_n$ is a time domain migration of the nth symbol, $f_n$ is a subcarrier spacing of the nth symbol, $g_n(t)$ is a prototype filter of the nth symbol.

In the present embodiment, according to attribute information of a subframe, determining filter configuration information corresponding to the subframe, wherein the attribute information includes any one of the followings or a combination thereof: a service type, subframe information, and channel information of a data signal; the data signal includes a data signal carried on the subframe; the subframe includes multiple symbols in time domain, and the data signal is carried on the symbols; and acquiring, according to each of the filter configuration information, a multi-carrier signal of filter bank corresponding to each of the filter configuration information. In the process of multi-carrier multiplexing, different filters are adopted for different services or different channels or different users, so as to meet the needs of the different services or different channels or different users and improve the efficiency of multi-carrier multiplexing.

Optionally, determining, according to the attribute information of the subframe, filter configuration information corresponding to the subframe includes any one of the following or a combination thereof:

determining, according to a subcarrier spacing of the subframe, a filter corresponding to the subframe; or determining, according to a delay requirement of the data signal carried by the subframe, a filter corresponding to the subframe; or determining, according to a delay requirement of the data signal carried by the subframe, a time domain extension of a filter corresponding to the subframe; or determining, according to subframe position information of the subframe, a filter corresponding to the subframe adjacent to an uplink and downlink switching point to be a filter with a small time domain expansion, that is, the subframe is located in the last subframe before the uplink and downlink switching point or the first subframe after the uplink and downlink switching point; or determining, according to subframe position information of the subframe, a time domain extension of a filter corresponding to the subframe adjacent to an uplink and downlink switching point to be consistent with the edge of the subframe, that is, the subframe is located in the last subframe before the uplink and downlink switching point or the first subframe after the uplink and downlink switching point.

For example, for a subframe with a large subcarrier spacing, a shorter filter bank can be used.

For a subframe that carries a service with a high requirement of processing delay, it is determined that the filter bank corresponding to the subframe is a shorter filter, or, for a subframe that carries a service with a high requirement of processing delay, it is determined that the time domain extension of the filter corresponding to the subframe is smaller; the filter bank of the subframe of users with high processing delay requirement may be shorter; for example, when the subframe is located at the uplink and downlink switching point (that is, the subframe is located in the last subframe before the uplink and downlink switching point or the first subframe after the uplink and downlink switching point), the time domain expansion of the multi-carrier signal of the subframe is reduced or remains consistent with the edge of the subframe. It should be noted that the determination of the high requirement on delay may be obtained by comparing the delay requirement with a preset value, and the determination of large subcarrier spacing may be obtained by comparing the subcarrier with a preset value.

Optionally, in order to reduce interference to other subframes, the time domain extension of the multicarrier signal of the subframe may be set to be reduced or to be consistent with the edge of the subframe, that is, the filter of the symbol of the edge of the sub-frame is different from the filter of other symbols.

Optionally, on the basis of the above-mentioned embodiment, according to each of the filter configuration information, after acquiring the multi-carrier signal of the filter bank corresponding to each of the filter configuration information, the method further includes:

transmitting filter configuration information to a terminal that receives the multicarrier signal.

It should be noted that, in an embodiment of the present disclosure, a subframe may be replaced by a symbol; the specific implementation manner is similar, and thus will not described herein in detail.

Figure 2:
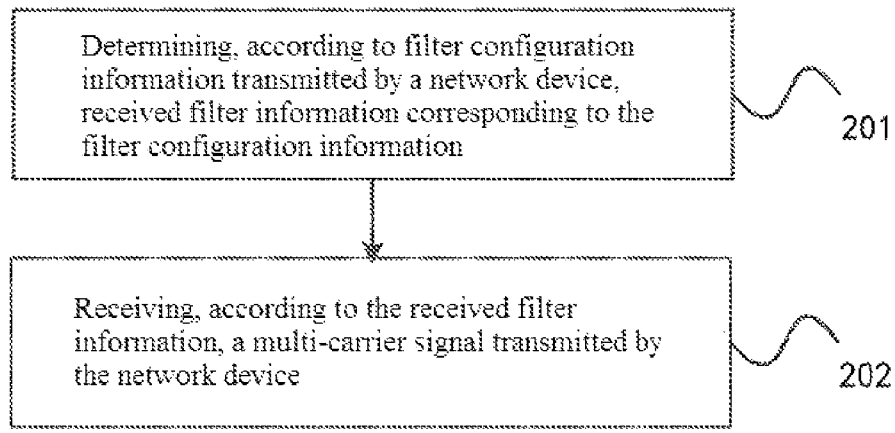
FIG. 2 is a schematic flowchart of a multi-carrier signal receiving method according to an embodiment of the present application.

FIG. 2 is a schematic flowchart of a multi-carrier signal receiving method according to an embodiment of the present application. As is shown in FIG. 2, the executor of the present embodiment may be a terminal or other apparatus that can receive multi-carrier, the multi-carrier signal receiving method according to the embodiment of the present invention includes:

in step 201, determining, according to filter configuration information transmitted by a network device, received filter information corresponding to the filter configuration information;

in step 202, receiving, according to the received filter information, a multi-carrier signal transmitted by the network device.

In the present embodiment, in the process of multi-carrier multiplexing, different filters are implemented for different services or different channels or different users, so as to meet the needs of the different services or different channels or different users and improve the efficiency of multi-carrier multiplexing.

Embodiments of the present disclosure also provide a computer readable storage medium, storing computer executable instructions, wherein the computer executable instructions are implemented by a processor to implement the method above.

Figure 3:
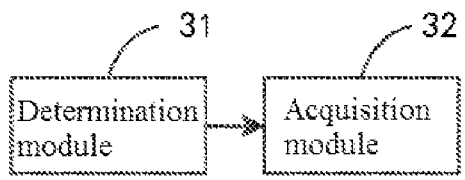
FIG. 3 is a schematic view of a multi-carrier signal generation apparatus according to an embodiment of the present application.

FIG. 3 is a schematic of a multi-carrier signal generation apparatus according to an embodiment of the present application. As is shown in FIG. 3, a multi-carrier signal generation apparatus of this embodiment includes: a determination module 31 and an acquisition module 32, wherein, the determination module 31 is configured to, according to attribute information of a subframe, determine filter configuration information corresponding to the subframe, the attribute information includes any one of the followings or a combination thereof:

a service type, subframe information, and channel information of the data signal; the data signal includes a data signal carried on the subframe;

the acquisition module 32 is configured to, according to each of the filter configuration information, acquire a multi-carrier signal of a filter bank corresponding to each of the filter configuration information.

In the present embodiment, according to attribute information of a subframe, determining filter configuration information corresponding to the subframe, wherein the attribute information includes any one of the followings or a combination thereof: a service type, subframe information, and channel information of a data signal; the data signal includes a data signal carried on the subframe; the subframe includes multiple symbols in time domain, and the data signal is carried on the symbols; and acquiring, according to each of the filter configuration information, a multi-carrier signal of filter bank corresponding to each of the filter configuration information. In the process of multi-carrier multiplexing, different filters are adopted for different services or different channels or different users, so as to meet the needs of the different services or different channels or different users and improve the efficiency of multi-carrier multiplexing.

Optionally, on the basis of the above-mentioned embodiment, the subframe information includes any one of the followings or a combination thereof: subcarrier spacing of at least two subframes, subframe location information, wherein the subcarrier spacing including a spacing between adjacent subcarriers of the subframe;

the service type includes delay information.

Optionally, on the basis of the above-mentioned embodiment, the determination module 31 is configured, by means of any one of the following or a combination thereof, to implement determining filter configuration information corresponding to the subframe according to attribute information of the subframe:

determining, according to subcarrier spacing of different subframes, a filter corresponding to the subframe in which the subcarrier spacing is greater than a preset value to be a short filter; or determining, according to a delay requirement of the data signal carried by the subframe, a filter corresponding to the subframe; or determining, according to a delay requirement of the data signal carried by the subframe, a time domain extension of a filter corresponding to the subframe; or determining, according to subframe position information of the subframe, a filter corresponding to the subframe adjacent to an uplink and downlink switching point to be a filter with a small time domain expansion; or determining, according to subframe position information of the subframe, a time domain extension of a filter corresponding to the subframe adjacent to an uplink and downlink switching point to be consistent with the subframe edge.

Optionally, on the basis of the above-mentioned embodiment, the determination module 31 is further configured such that the filter of the symbol of the edge of the subframe is set to be different from the filter of the other symbols.

Optionally, on the basis of the above-mentioned embodiment, the determination module 31 is further configured to transmit filter configuration information to a terminal that receives the multi-carrier signal.

Figure 4:
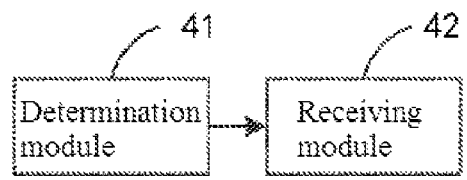
FIG. 4 is a schematic view of a multi-carrier signal receiving apparatus according to an embodiment of the present application.

FIG. 4 is a schematic of a multi-carrier signal receiving apparatus according to an embodiment of the present application. As is shown in FIG. 4, a multi-carrier signal receiving apparatus of this embodiment includes: a determination module 41 and a receiving module 42. wherein, the determination module 41 is configured to, according to filter configuration information transmitted by a network device, determine received filter information corresponding to the filter configuration information;

the receiving module 42 is configured to, according to the received filter information, receive a multi-carrier signal transmitted by the network device.

In the present embodiment, in the process of multi-carrier multiplexing, different filters are adopted for different services or different channels or different users, so as to meet the needs of the different services or different channels or different users and improve the efficiency of multi-carrier multiplexing.

Embodiments of the present disclosure provide a system, including: an apparatus for receiving multi-carrier signals as shown in FIG. 3 and an apparatus for receiving multi-carrier signals as shown in FIG. 4.

It will be apparent to those skilled in the art that all or some of the steps of the method, systems, and functional blocks/units of the apparatus disclosed above may be implemented by software, firmware, hardware, and suitable combinations thereof. In a hardware implementation, the division between functional modules/units mentioned in the above description does not necessarily correspond to the division of physical units; for example, one physical component may have multiple functions, or a function or step can be performed cooperatively by several physical components. Some or all of the components may be implemented as software executed by a processor, such as a digital signal processor or microprocessor, or as hardware, or as an integrated circuit, such as an application specific integrated circuit. Such software may be distributed on computer readable media, which may include computer storage media (or non-transitory media) and communication media (or transitory media). As is well known to those skilled in the art, computer storage media includes any method for storing information (such as computer readable instructions, data structures, program modules, or other data) or volatile and non-volatile, removable and non-removable media implemented in the technology. Computer storage media includes, but is not limited to, RAM, ROM, EEPROM, flash memory or other memory technology, CD-ROM, digital versatile disc (DVD) or other optical disc storage, magnetic cassette, magnetic tape, magnetic disk storage or other magnetic storage device, or any other medium that can be used to store the desired information and can be accessed by the computer. Moreover, it is well known to those skilled in the art that communication media typically includes computer readable instructions, data structures, program modules or other data in a modulated data signal, such as a carrier wave or other transport mechanism, and includes any information delivery media.

While the embodiments of the present invention have been described above, the described embodiments are merely for the purpose of understanding the invention and are not intended to limit the invention. Any modification and variation in the form and details of the embodiments may be made by those skilled in the art without departing from the spirit and scope of the invention, but the scope of the invention is to be determined by the scope of the appended claims.

INDUSTRIAL APPLICABILITY

In the process of multi-carrier multiplexing, different filters are implemented for different services or different channels or different users, so as to meet the needs of different services or different channels or different users and improve the efficiency of multi-carrier multiplexing.

What is claimed is:

1. A multi-carrier signal generation method, comprising:
determining, according to attribute information of a subframe, filter configuration information corresponding to the subframe, wherein the attribute information comprises any one of the following or a combination of more than one of the following:
a service type, subframe information, and channel information of a data signal;
wherein the data signal comprises a data signal carried on the subframe, and the service type comprises a delay requirement; and
acquiring, according to each of the filter configuration information, a multi-carrier signal of filter bank corresponding to each of the filter configuration information,
wherein determining, according to attribute information of a subframe, filter configuration information corresponding to the subframe comprises any one of the following or a combination of more than one of the following:
determining, according to a subcarrier spacing of the subframe, a filter corresponding to the subframe;
determining, according to a delay requirement of the data signal carried by the subframe, a filter corresponding to the subframe;
determining, according to a delay requirement of the data signal carried by the subframe, a time domain extension of a filter corresponding to the subframe;
determining, according to subframe position information of the subframe, a filter corresponding to the subframe adjacent to an uplink and downlink switching point to be a filter with a small time domain expansion; and determining, according to subframe position information of the subframe, a time domain extension of a filter corresponding to the subframe adjacent to an uplink and downlink switching point to be consistent with edge of the subframe.

2. The method according to claim 1, wherein the subframe information comprises any one of the following or a combination of more than one of the following:

subcarrier spacing, and subframe position information;
wherein the subcarrier spacing comprises a spacing between adjacent subcarriers of the subframe.

3. The method according to claim 2, further comprising:
after acquiring, according to each of the filter configuration information, a multi-carrier signal of filter bank corresponding to each of the filter configuration information, transmitting the filter configuration information to a terminal that receives the multi-carrier signal.

4. The method according to claim 1, further comprising:
setting filter of the symbol of the edge of the subframe to be different from filter of other symbols.

5. The method according to claim 4, further comprising:
after acquiring, according to each of the filter configuration information, a multi-carrier signal of filter bank corresponding to each of the filter configuration information, transmitting the filter configuration information to a terminal that receives the multi-carrier signal.

6. The method according to claim 1, further comprising:
after acquiring, according to each of the filter configuration information, a multi-carrier signal of filter bank corresponding to each of the filter configuration information, transmitting the filter configuration information to a terminal that receives the multi-carrier signal.

7. A multi-carrier signal generation apparatus, comprising:
a processor; and
a memory for storing instructions executable by the processor;
wherein the processor is configured to implement the method of claim 1.

8. The apparatus according to claim 7, wherein the subframe information comprises any one of the following or a combination of more than one of the following:
subcarrier spacing, and subframe position information;
wherein the subcarrier spacing comprises a spacing between adjacent subcarriers of the subframe.

9. The apparatus according to claim 8,
the processor is further configured to transmit filter configuration information to a terminal that receives the multi-carrier signal.

10. The apparatus according to claim 7,
the processor is further configured such that filter of the symbol of the edge of the subframe is different from filter of other symbols.

11. The apparatus according to claim 10,
the processor is further configured to transmit filter configuration information to a terminal that receives the multi-carrier signal.

12. The apparatus according to claim 7,
the processor is further configured to transmit filter configuration information to a terminal that receives the multi-carrier signal.

13. A non-transitory computer readable storage medium, storing computer executable instructions, wherein the computer executable instructions, when being executed by a processor, implement the method of claim 1.

14. The method according to claim 1, further comprising:
after acquiring, according to each of the filter configuration information, a multi-carrier signal of filter bank corresponding to each of the filter configuration information, transmitting the filter configuration information to a terminal that receives the multi-carrier signal.

15. A multi-carrier signal receiving method, comprising:
determining, according to filter configuration information transmitted by a network device, received filter information corresponding to the filter configuration information; and
receiving, according to the received filter information, a multi-carrier signal transmitted by the network device,
wherein the filter configuration information is determined by the network device according to attribute information of a subframe; and
wherein the network device determines, by means of at least one of the following, the filter configuration information according to attribute information of the subframe:
the network device determines, according to a subcarrier spacing of the subframe, a filter corresponding to the subframe;
the network device determines, according to a delay requirement of the data signal carried by the subframe, a filter corresponding to the subframe;
the network device determines, according to a delay requirement of the data signal carried by the subframe, a time domain extension of a filter corresponding to the subframe;
the network device determines, according to subframe position information of the subframe, a filter corresponding to the subframe adjacent to an uplink and downlink switching point to be a filter with a small time domain expansion; and
the network device determines, according to subframe position information of the subframe, a time domain extension of a filter corresponding to the subframe adjacent to an uplink and downlink switching point to be consistent with edge of the subframe.

16. A multi-carrier signal receiving apparatus, comprising:
a processor; and
a memory for storing instructions executable by the processor;
wherein the processor is configured to implement the method of claim 15.

17. A non-transitory computer readable storage medium, storing computer executable instructions, wherein the computer executable instructions, when being executed by a processor, implement the method of claim 15.

* * * * *